United States Patent
Hosokawa et al.

(10) Patent No.: US 11,475,715 B2
(45) Date of Patent: Oct. 18, 2022

(54) INPUT/OUTPUT DEVICE, SCREEN CONTROL DEVICE, AND SCREEN CONTROL METHOD

(71) Applicant: NEC Corporation, Tokyo (JP)

(72) Inventors: Tatsuro Hosokawa, Tokyo (JP); Jun Kondo, Tokyo (JP); Naoki Morishita, Tokyo (JP); Yutaro Kitahata, Tokyo (JP)

(73) Assignee: NEC CORPORATION, Tokyo (JP)

( * ) Notice: Subject to any disclaimer, the term of this patent is extended or adjusted under 35 U.S.C. 154(b) by 33 days.

(21) Appl. No.: 16/981,854

(22) PCT Filed: Feb. 1, 2019

(86) PCT No.: PCT/JP2019/003635
§ 371 (c)(1),
(2) Date: Sep. 17, 2020

(87) PCT Pub. No.: WO2019/181232
PCT Pub. Date: Sep. 26, 2019

(65) Prior Publication Data
US 2021/0034897 A1    Feb. 4, 2021

(30) Foreign Application Priority Data
Mar. 20, 2018   (JP) .............................. JP2018-053197

(51) Int. Cl.
*G06V 40/60*    (2022.01)
*G06F 3/14*    (2006.01)
(Continued)

(52) U.S. Cl.
CPC ............ *G06V 40/67* (2022.01); *G06F 3/1423* (2013.01); *G09G 5/02* (2013.01); *G09G 5/38* (2013.01); *G09G 2354/00* (2013.01)

(58) Field of Classification Search
CPC ..... G06V 40/67; G06F 3/1423; G06F 3/1446; G09G 5/02; G09G 5/38; G09G 2354/00;
(Continued)

(56) References Cited

U.S. PATENT DOCUMENTS 8,254,647 B1 *  8/2012  Nechyba ................ G06K 9/036
                                                         382/118
9,940,884 B1 *  4/2018  Musolin .............. G06F 3/04847
(Continued)

FOREIGN PATENT DOCUMENTS

CN      106210513 A     12/2016
JP      H07-111638 A    4/1995
(Continued)

OTHER PUBLICATIONS

International Search Report for PCT Application No. PCT/JP2019/003635, dated Mar. 5, 2019.
(Continued)

*Primary Examiner* — Michael E Teitelbaum
(74) *Attorney, Agent, or Firm* — Sughrue Mion, PLLC

(57) ABSTRACT

An input/output device is configured to input or output operation information of an operator with a terminal device. The input/output device includes a display having a first display screen and a second display screen, an imaging device which is interposed between the first display screen and the second display screen and configured to capture an image of the operator positioned in the foreside of the terminal device, and a screen controller configured to control coordination of the first display screen and the second display screen and to thereby guide operator's eyes toward the imaging device interposed between the first display screen and the second display screen.

5 Claims, 5 Drawing Sheets

(51) Int. Cl.
*G09G 5/02* (2006.01)
*G09G 5/38* (2006.01)

(58) Field of Classification Search
CPC ............ G09G 2340/0464; G09G 5/32; G06Q 20/1085; G06Q 20/34; G07F 19/201
See application file for complete search history.

(56) References Cited

U.S. PATENT DOCUMENTS

| | | | |
|---|---|---|---|
| 2004/0192444 A1* | 9/2004 | Morrison | G07F 17/3241 463/46 |
| 2013/0135508 A1 | 5/2013 | Inaba | |
| 2017/0046037 A1* | 2/2017 | Dand | G06F 3/0488 |

FOREIGN PATENT DOCUMENTS

| | | |
|---|---|---|
| JP | H11-175643 A | 7/1999 |
| JP | 2004-070635 A | 3/2004 |
| JP | 2004-120333 A | 4/2004 |
| JP | 2013-114594 A | 6/2013 |
| TW | 200604959 A | 2/2006 |
| TW | 200903379 A | 1/2009 |
| TW | 201023633 A | 6/2010 |
| TW | 201112045 A | 4/2011 |
| TW | 201218093 A | 5/2012 |
| TW | I665913 A | 7/2019 |

OTHER PUBLICATIONS

Taiwanese Office Action for TW Application No. 108108126 dated May 27, 2021 with English Translation.

* cited by examiner

INPUT/OUTPUT DEVICE, SCREEN CONTROL DEVICE, AND SCREEN CONTROL METHOD

This application is a National Stage Entry of PCT/JP2019/003635 filed on Feb. 1, 2019, which claims priority from Japanese Patent Application 2018-053197 filed on Mar. 20, 2018, the contents of all of which are incorporated herein by reference, in their entirety.

TECHNICAL FIELD

The present invention relates to an input/output device such as a terminal device, a screen control device, and a screen control method.

BACKGROUND ART

Conventionally, terminal devices configured to conduct automated transactions in money and products have been installed in many places. For example, branches of financial institutions such as banking facilities have been furnished with automatic teller machines (ATMs) allowing customers to deposit or withdraw cash or to inquire balances in account. ATMs are terminal devices configured to communicate with computer systems (or account-settlement systems) of financial institutions online and to thereby increase or decrease account balances according to customers' operations, wherein due to the necessity of personal authentication, ATMs should request customers to insert cash cards therein and to input personal identification numbers. Recently, for the purpose of preventing crimes using ATMs and improving convenience of providing information to customers, ATMs have been equipped with cameras configured to capture images of operators together with operation screens. ATMs are equipped with input/output devices including operation consoles and display screens configured to display various pieces of information and contents of customers' operations.

Patent Documents 1-3 disclose technologies relating to input/output devices including multiple displays. Patent Document 1 discloses an eye-contact-type display imaging device for multipoint videophones, which is equipped with multiple display devices configured to display multisystem video signals and a microminiature camera interposed between two display devices among multiple display devices. The display imaging device may keep a small distance between a microminiature camera and the position of eyes of communication partners displayed on display devices juxtaposed on both sides of a microminiature camera, thus allowing communication partners to converse each other with their eyes roughly contacting each other.

Patent Document 2 discloses a screen-setting method of a multi-display system including a first screen display device and a second screen display device with two screens which are integrally combined together to realize a single display.

Patent Document 3 discloses an automated transaction machine, such as an ATM and an automatic-ticket-vending machine, equipped with two imaging cameras which are disposed at opposite positions across a banknote-deposit-withdrawal slot disposed close to a color-liquid-crystal display and which are used to capture an image of a user's upper-half body, to recognize user's features, and to thereby switch over a manner of displaying information relating to automated transactions conveyed to the user.

CITATION LIST

Patent Literature Document

Patent Document 1: Japanese Patent Application Publication H07-111638
Patent Document 2: Japanese Patent Application Publication 2004-70635
Patent Document 3: Japanese Patent Application Publication H11-175643

SUMMARY OF INVENTION

Technical Problem

Conventionally-known technologies disclosed by Patent Documents 1-3 are each equipped with a display screen visually watched by an operator and an imaging device configured to capture an image of an operator. However, those technologies need to set a direction and an angle of view of an imaging device such as a camera in order to accurately capture an image of an operator subjected to imaging, and therefore it is not always for an operator to immediately recognize the imaging device by oneself. For example, it is difficult for an operator to recognize an imaging device and to thereby turn to an appropriate direction to capture a front-face image of oneself.

The present invention is made in consideration of the aforementioned circumstances, and therefore the present invention aims to provide an input/output device, a screen control device, and a screen control method which may help an operator naturally turn his/her eyes toward an imaging device without being conscious of sight guidance with a terminal device including a display device and an imaging device, thus causing an imaging device to clearly capture a front-face image of an operator.

Solution to Problem

A first aspect of the present invention is directed to an input/output device configured to input or output operation information of an operator with a terminal device. The input/output device includes a display including a first display screen and a second display screen, an imaging device which is interposed between the first display screen and the second display screen and configured to capture an image of the operator positioned in the foreside of the terminal deice, and a screen controller configured to control coordination of the first display screen and the second display screen and to thereby guide operator's eyes toward the imaging device.

A second aspect of the present invention is directed to a terminal device including an input/output device and a process execution part. The input/output device includes a display further including a first display screen and a second display screen, an imaging device which is interposed between the first display screen and the second display screen and configured to capture an image of an operator positioned in the foreside of the display, and a screen controller configured to control coordination of the first display screen and the second display screen and to thereby guide operator's eyes toward the imaging device. The processing execution part is configured to execute a display process of the display to display the operation information of the operator, which is input using the input/output device, in association with the image of the operator captured by the imaging device and/or a transaction process of a predetermined product.

A third aspect of the present invention is directed to a screen control device adapted to an input/output device configured to input or output operation information of an operator with a terminal device. The input/output device further includes a display having a first display screen and a second display screen, and an imaging device interposed between the first display screen and the second display screen. The screen control device is configured to control coordination of the first display screen and the second display screen, to guide operator's eyes toward the imaging device interposed between the first display screen and the second display screen, and to thereby capture an image of the operator positioned in a foreside of the terminal device with the imaging device.

A fourth aspect of the present invention is directed to a screen control method adapted to an input/output device configured to input or output operation information of an operator with a terminal device. The input/output device includes a display having a first display screen and a second display screen, and an imaging device interposed between the first display screen and the second display screen. The screen control method comprises the steps of: controlling coordination of the first display screen and the second display screen; guiding operator's eyes toward the imaging device interposed between the first display screen and the second display screen; and capturing an image of the operator positioned in the foreside of the terminal device with the imaging device.

A fifth aspect of the present invention is directed to a non-transitory computer-readable storage medium having stored a program causing a computer of an input/output device configured to input or output operation information of an operator with a terminal device to implement the aforementioned screen control method.

Advantageous Effects of Invention

The present invention is designed to clearly capture a front-face image of an operator standing in the foreside of a terminal device by guiding operator's eyes toward the lens of an imaging device interposed between two display screens. The present invention can be realized using the existing facilities since the present invention can be applied to an input/output device embedded in a terminal device as well as a screen control device configured to carry out a screen control process to guide operator's eyes toward two display screens installed in an input/output device and its programs (or storage media).

DESCRIPTION OF EMBODIMENT

Figure 1:
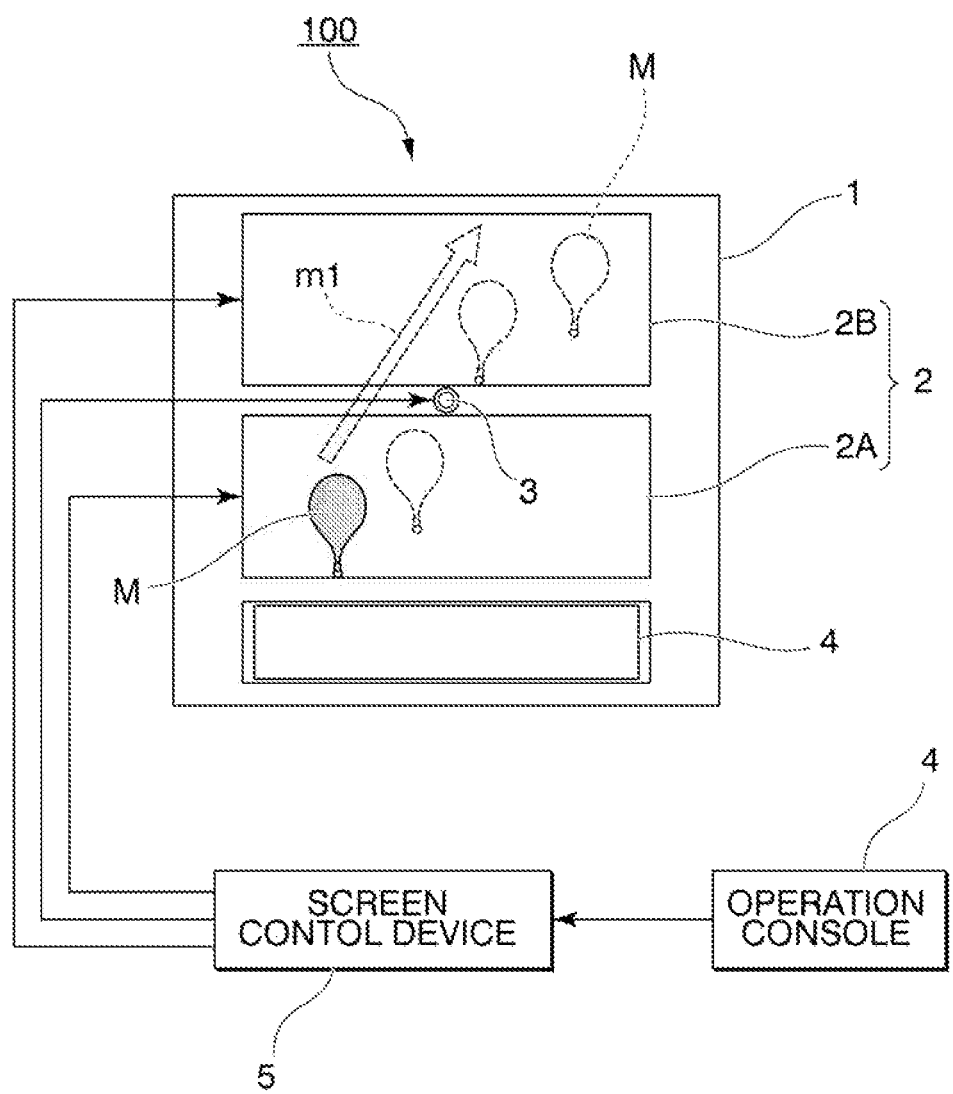
FIG. 1 is a schematic diagram of an input/output device according to the embodiment of the present invention.

An input/output device such as a terminal device, a screen control device, and a screen control method according to the present invention will be described in detail with reference to the accompanying drawings. FIG. 1 shows a minimum configuration of an input/output device 100 according to the embodiment of the present invention. The input/output device 100 includes a main body 1, a display 2, an imaging device 3, an operation console 4, and a screen control device 5. The display 2 includes a first display screen 2A and a second display screen 2B. The imaging device 3 is interposed between the first display screen 2A and the second display screen 2B and configured to capture an image of an operator standing in the foreside of the main body 1. The operation console 4 is configured to accept operations made by an operator, and therefore an operator may input or output information with the input/output device 100 based on operation contents displayed on the display 2. The screen control device 5 is configured to control contents displayed on the first display screen 2A and the second display screen 2B, and therefore the screen control device 5 may guide operator's eyes towards the imaging device 3 by coordinating contents displayed on the first display screen 2A and the second display screen 2B. For example, the screen control device 5 may control the display 2 to move a movable object M displayed on the screen in a direction (indicated by an arrow m1) from the first display screen 2A to the second display screen 2B or in its reverse direction.

According to the aforementioned input/output device 100, it is possible to guide operator's eyes toward the imaging device 3 interposed between the first display screen 2A and the second display screen 2B by coordinating the displayed content of the first display screen 2A with the displayed content of the second display screen 2B. Accordingly, the input/output device 100 may allow an operator to naturally turn his/her eyes toward the imaging device 3 without being conscious of sight guidance in particular. During movement of operator's eyes, the imaging device 3 may clearly capture a front-face image of an operator. It is possible to clearly capture a front-face image of an operator using the existing facilities since the input/output device 100 is configured to guide operator's eyes toward the imaging device 3 neighboring the display 2. For this reason, it is possible to achieve an authentication process for operators at low cost and to achieve high security.

Figure 2:
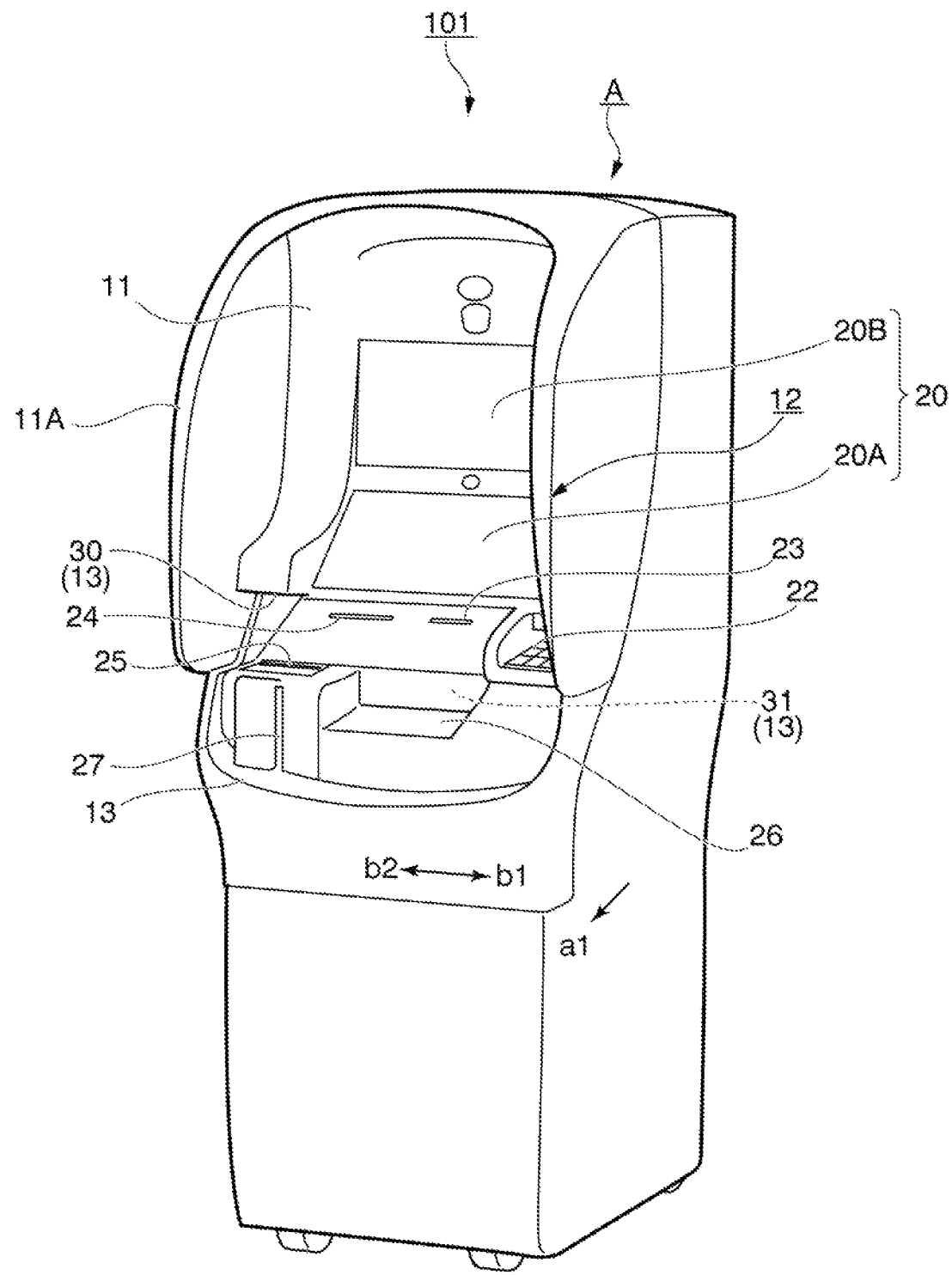
FIG. 2 is a perspective view showing an external appearance of the input/output device according to the embodiment of the present invention.

Next, the concrete configuration and operation of an input/output device 101 will be described with reference to FIGS. 2 to 5. FIG. 2 is a perspective view showing an external appearance of the input/output device 101. The input/output device 101 may correspond to an automatic teller machine (ATM) A serving as a terminal device installed in a bank branch. The automatic teller machine A includes a main body 11 configured to conduct a cash-deposit-withdrawal process of banknotes, an operation console 12 including a display 20, a sensing device 13 including a surveillance camera and sensors, and a screen controller 14 configured to control a display process of the display 12.

The operation console 12 is attached to the foreside of the main body 11 (in an arrow direction a1) of input/output device 101 which an operator may stand by, wherein the operation console 12 includes a touch-operation screen used to input information into the automatic teller machine A, a ten-key unit, an IC-card reader and the like. Specifically, the operation console 12 includes the display 20 including a first display screen 20A and a second display screen 20B arranged in the upper section of the main body 11, a ten-key unit 22 arranged in the middle section of the main body 11, a card-insertion slot 23, a receipt slot 24, an IC-card reader 25, a cash-delivery port 26, and an interphone 27.

The first display screen 20A is a touch display screen to be operated by a user. The second display screen 20B is positioned above the first display screen 20A to demonstrate that the input/output device 101 serves as the automatic teller machine A, wherein the second display screen 20B is a display showing available card information and guidance such as advertisements. The ten-key unit 22 is arranged in the right side of the main body 11 to allow a user to input a personal identification number and/or the amount of withdrawing money.

The card-insertion slot 23 is an opening used for a user to deposit or withdraw money and/or to insert a cash card or a credit card. The cash-delivery port 26 is a cash slot used for a user to input or output banknotes, wherein the cash-delivery port 26 is furnished with a shutter (not shown) allowing a user to deposit or withdraw banknotes. The interphone 27 is arranged in the left side of the main body 11 and used by a user when communicating with personnel in a bank branch or a call center.

The sensing device 13 is configured of a skimmer-sensing camera (e.g. a device configured to capture an image indicative of a fraudulent activity to read magnetic data from cards) 30, a human sensor 31, and a surveillance camera 32. In this connection, the skimmer-sensing camera 30 will be referred to as a first imaging device configured to monitor a fraudulent activity at the card-insertion slot 23, the cash-delivery port 26, or neighboring areas. The skimmer-sensing camera 30 is configured to monitor a fraudulent activity in the neighborhood of the card-insertion slot 23 and to read information described in storage media (e.g. a cash card, a credit card, etc.) allocated at a readout position of the IC-card reader 25.

The human sensor 31 is a detector configured to detect the existence/nonexistence of a user in the foreside of the operation console 12. The surveillance camera 32 is interposed between the first display screen 20A and the second display screen 20B such that the monitoring area thereof is allocated to the foreside of the operation console 12. In this connection, the surveillance camera 32 will be referred to as a second imaging device configured to capture an image of a person standing in the foreside of the operation console 12 when the human sensor 31 detects the person.

The main body 11 further includes various internal units such as an information processing device configured to process various pieces of information input by the first display screen 20A, the ten-key unit 22, the card-insertion slot 23, and the IC-card reader 25, a cash-deposit-withdrawal device configured to deposit or withdraw banknotes with the cash-delivery port 26 and/or to make deposits in bank account, a printing device configured to print various pieces of information on receipts exited from the receipt slot 24, which are omitted from FIG. 2.

A cover 11A is attached to the foreside of the main body 11. The cover 11A includes sideboards covering the operation console 12 in its sides and an upper board covering the operation console 12 in its upper side. Since the cover 11A is used to cover the surrounding areas of the operation console 12 using its sideboards and upper board, it is possible to prevent an external person from watching a user's operation on the screen.

Figure 3:
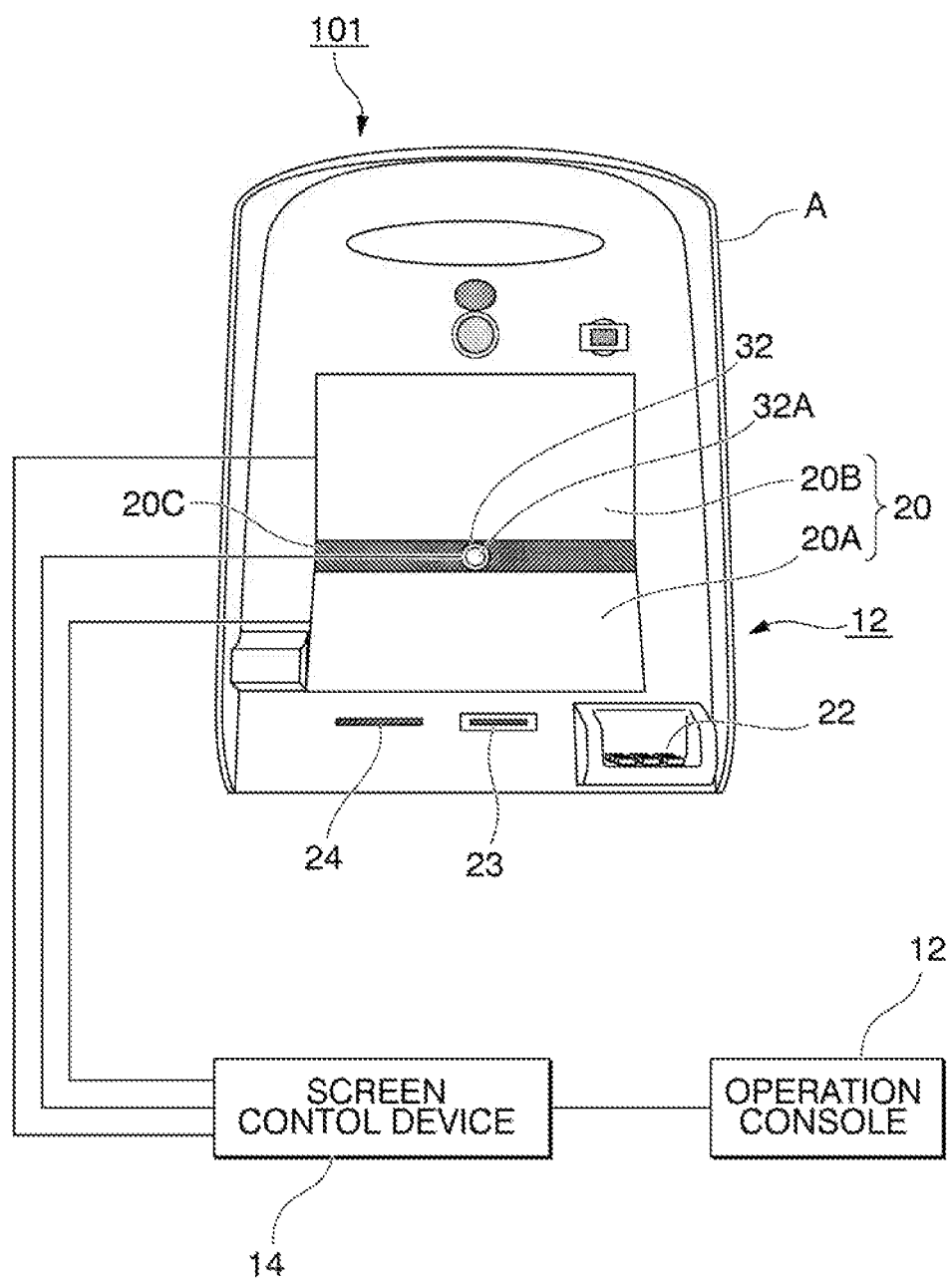
FIG. 3 is a schematic diagram showing a configuration used for illustrating a screen control method according to the embodiment of the present invention.
Figure 4:
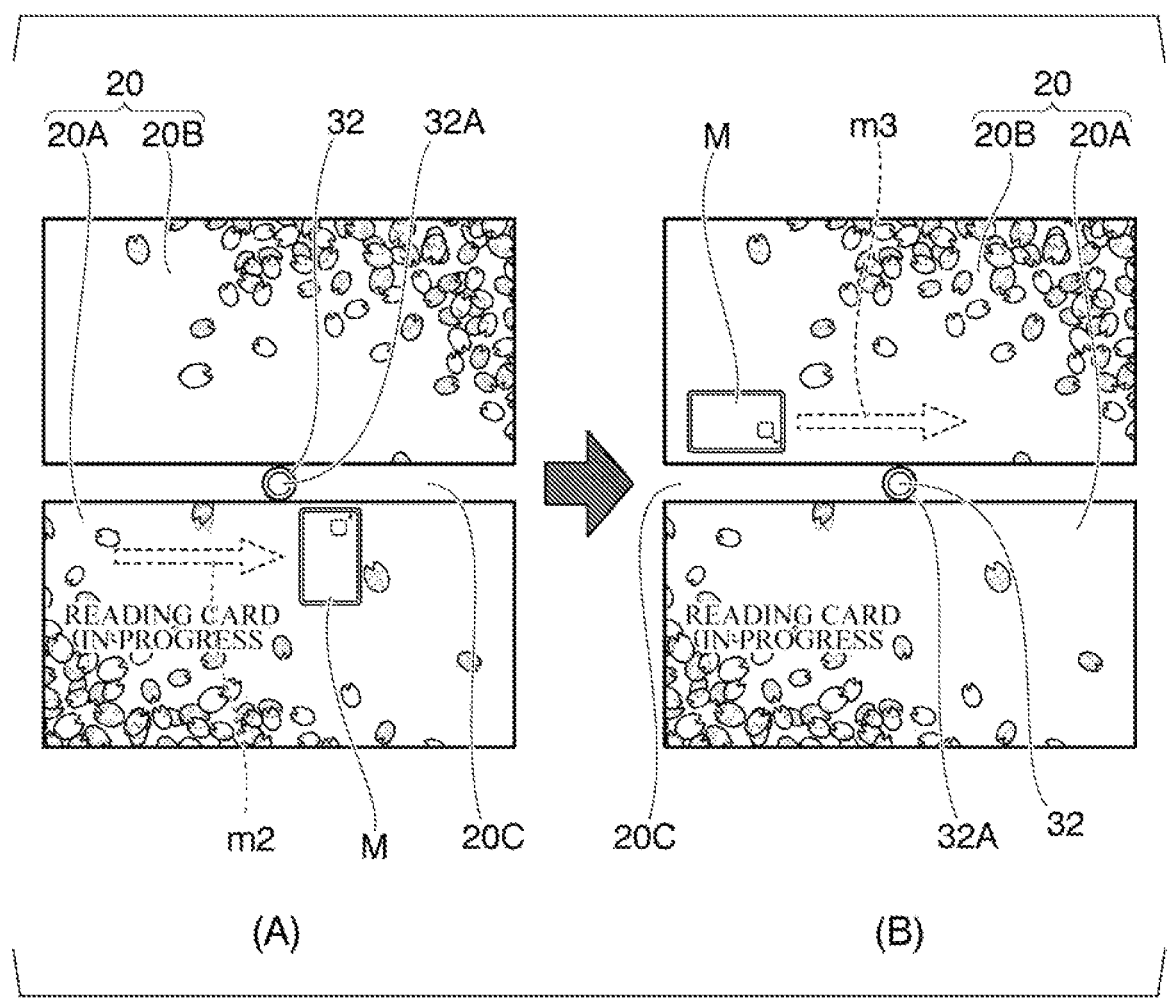
FIG. 4 shows a first display example of images displayed on two display screens included in the input/output device according to the embodiment of the present invention, thus depicting a screen-image transition between (A) and (B).

Next, a screen control method of the input/output device 100 will be described in detail together with operations of the display device 20 including the first display screen 20A and the second display screen 20B, the surveillance camera 32 embedded in the display 20, and the screen control device 14 of the display 20 with reference to FIGS. 3 to 5. FIG. 3 shows the configuration to realize the screen control method of the present embodiment, i.e. the configuration including the screen controller 14 and part of constituent elements of the input/output device 101.

As described above with reference to FIGS. 1-2, the first display screen 20A and the second display screen 20B included in the display 20 are vertically juxtaposed in the upper front face of the main body 11 of the input/output device 100. The surveillance camera 32 is arranged such that an imaging lens 32A is disposed at an intermediate position in the left-right direction (or a direction of bidirectional arrows b1-b2) of the first display screen 20A and the second display screen 20B. In addition, a smoke area 20C having a dark color such as dark grey and black is interposed between the first display screen 20A and the second display screen 20B. The imaging lens 32A of the surveillance camera 32 is disposed at an intermediate position of the smoke area 20C.

The screen controller 14 is configured to control coordination between the display content of the first display screen 20A and the display content of the second display screen 20B, wherein the screen controller 14 may coordinate the display contents of those screens to guide user's eyes toward the surveillance camera 32. For example, the screen controller 14 may carry out a screen control process to move a movable object M displayed on the screen in a direction from the first display screen 20A to the second display screen 20B or in its reverse direction.

The screen control method of the present embodiment will be described with reference to FIG. 4(A), (B) and FIG. 5. FIG. 4(A), (B) shows a first display example of images displayed on the first display screen 20A and the second display screen 20B. In FIG. 4(A), (B), an image representative of a rectangular shape of a card serving as the movable object M is displayed together with dotted arrows m2, m3 in a desired figure on the first display screen 20A and the second display screen 20B in the display 20. A screen transition is made from FIG. 4(A) to FIG. 4(B). Specifically, in FIG. 4(A), the dotted arrow m2 directed leftward is displayed close to an image representative of a vertically-oriented shape of a card serving as the movable object M along with a message of "reading card in progress" on the first display screen 20A. In FIG. 4(B), the image of the movable object M is erased from the first display screen 20A while the dotted arrow m3 directed rightward is displayed close to an image representative of a horizontally-oriented shape of a card serving as the movable object M on the second display screen 20B. That is, FIG. 4(A), (B) shows as if the movable object M is moving in a direction from the first display screen 20A to the second display screen 20B to pass by the neighborhood of the imaging lens 32A of the surveillance camera 32 along with guidance of user's eyes from the left corner of to the center of the screen using arrows m2, m3. According to the screen control process, it is possible for the input/output device 101 to naturally turn user's eyes toward the imaging lens 32A of the surveillance camera 32 without causing user's consciousness of sight guidance.

The arrow m2 indicates in FIG. 4(A) that the movable object M may pass by the neighborhood of the imaging lens 32A disposed at the upper center position of the first display screen 20A while the arrow m3 indicates in FIG. 4(B) that the movable object M may pass by the neighborhood of the imaging lens 32A disposed at the lower center position of the second display screen 20B; but this screen control process is not restrictive. For example, it is possible to exchange the display content of FIG. 4(A) with the display content of FIG. 4(B) and to consequently display the movable object M moving from the first display screen 20A to the second display screen 20B.

Figure 5:
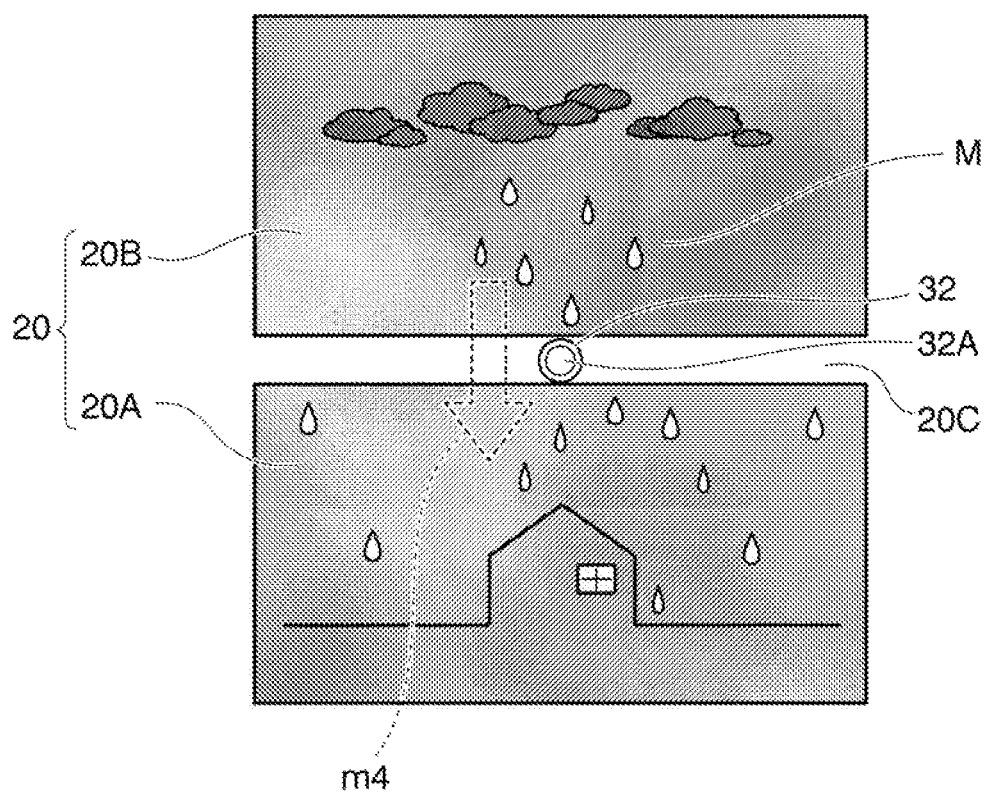
FIG. 5 shows a second display example of images displayed on two display screens included in the input/output device according to the embodiment of the present invention.

FIG. 5 shows a second display example of images displayed on the first display screen 20A and the second display screen 20B included in the input/output device 101. In FIG. 5, an image of multiple raindrops is displayed along with an image resembling the shape of a house on the first display screen 20A while an image of a movable object M representing multiple raindrops is displayed along with an image of clouds on the second display screen 20B. In addition, a dotted arrow m4 indicates an image representative of raindrops being dropped from the second display screen 20B to the first display screen 20A. This may give a user an image of raindrops passing by the imaging lens 32A of the surveillance camera 32 interposed between the first display screen 20A and the second display screen 20B. According to the screen control process, it is possible for the input/output device 101 of the present embodiment to naturally turn user's eyes toward the imaging lens 32A of the surveillance camera 32 without causing user's consciousness of sight guidance. At this time, it is possible for the screen controller 14 to prevent a user from being conscious of the existence of the surveillance camera 32 by setting a same color or a similar color of the smoke area 20C as the background color of the first display screen 20A and the second display screen 20B.

As described above, the input/output device 101 of the present embodiment is configured to guide user's eyes toward the surveillance camera 32 interposed between the first display screen 20A and the second display screen 20B by means of the screen controller 14 configured to coordinate display contents between the first display screen 20A and the second display screen 20B. Accordingly, it is possible for the input/output device 101 to naturally turn user's eyes toward the surveillance camera 32 without causing user's consciousness of sight guidance. During guidance of user's sight, the surveillance camera 32 may clearly capture a front-face image of a user. As a result, it is possible to achieve the screen control method of the present embodiment at low cost since the input/output device 101 of the present embodiment is configured to clearly capture a front-face image of a user using the existing facilities. In addition, it is possible to achieve high security with respect to the input/output device 101 such as an ATM using the surveillance camera 32 configured to capture a front-face image of a user in detail.

According to the input/output device 101 of the present embodiment, it is possible to reliably guide user's eyes toward the surveillance camera 32 by executing the screen control process for controlling the movable object M, which is movable between the first display screen 20A and the second display screen 20B, to pass by the neighborhood of the imaging lens 32A of the surveillance camera 32.

In the input/output device 101, the first display screen 20A and the second display screen 20B are each configured of a single screen; but this is not a restriction. That is, one or both of the first display screen 20A and the second display screen 20B can be configured of multiple screens. At this time, it is necessary for the screen controller 14 to execute the screen control process such that the movable object M may pass by the neighborhood of a lens of an imaging device interposed between multiple screens.

In the aforementioned input/output device 101, the second display screen 20B is configured of a display panel used to display advertisements; but this is not a restriction. Similar to the first display screen 20A, the second display screen 20B may be configured of a touch display panel operable by an operator.

In the above, the embodiment of the present invention has been described in detail with reference to the accompanying drawings; but the present invention is not necessarily limited to the foregoing embodiment. The present invention may embrace any modifications and design changes without departing from the scope of the invention as defined in the appended claims.

The present application claims the benefit of priority on Japanese Patent Application No. 2018-53197 filed on Mar. 20, 2018, the subject matter of which is hereby incorporated herein by reference.

INDUSTRIAL APPLICABILITY

The present invention aims to provide an input/output device, a screen control device, and a screen control method which are applicable to automatic teller machines. However, the present invention can be applied to other fields such as terminal devices conducting automated transactions of money and products such as automatic ticket vending machines and other terminal devices needing security such as safety inspection machines in airports.

REFERENCE SIGNS LIST 1 main body
2 display
2A first display screen
2B second display screen
3 imaging device
4 operation console
5 screen control device
11 main body
12 operation console
13 sensing device
14 screen controller
20 display
20A first display screen
20B second display screen
20C smoke area
32 surveillance camera
32A imaging lens
100, 101 input/output device
A automatic teller machine
M movable object

What is claimed is:

1. An input/output device configured to input or output operation information of an operator comprising:
a display including a first display screen and a second display screen;
an imaging device disposed at an intermediate position between the first display screen and the second display screen and configured to capture an image of the operator when seeing a foreside of the display; and
a screen controller configured to guide operator's eyes toward the imaging device using a movable object displayed on either the first display screen or the second display screen, wherein the screen controller is configured to control the movable object to pass by a position of a lens of the imaging device such that the movable object moves from the first display screen to the second display screen.

2. The input/output device according to claim 1, wherein the display includes an intermediate area having a predetermined color between the first display screen and the second display screen, wherein a lens of the imaging device is disposed in the intermediate area, and wherein the screen controller is configured to control a background color of the first display screen and a background color of the second display screen to resemble the predetermined color of the intermediate area.

3. The input/output device according to claim 1, wherein, the first display screen is configured to accept the operation information of the operator while the second display screen is configured to provide predetermined information to the operator.

4. A terminal device comprising:
an input/output device which comprises a display including a first display screen and a second display screen,
an imaging device disposed at an intermediate position between the first display screen and the second display screen and configured to capture an image of an operator when seeing a foreside of the display, and
a screen controller configured to guide operator's eyes toward the imaging device using a movable object displayed on either the first display screen or the second display screen such that the movable object passes by a position of a lens of the imaging device; and
a processing execution part configured to control the display to display operation information of the operator, which is input using the input/output device, in association with the image of the operator captured by the imaging device.

5. A screen control device adapted to an input/output device configured to input or output operation information of an operator, wherein the input/output device comprises a display including a first display screen and a second display screen, and an imaging device disposed at an intermediate position between the first display screen and the second display screen, thus guiding operator's eyes toward the imaging device, using a movable object displayed on either the first display screen or the second display screen and thereby capturing an image of the operator when seeing a foreside of the display.

* * * * *